No. 619,557. Patented Feb. 14, 1899.
C. GABRIEL.
CHUCK FOR PRESS PLUNGERS.
(Application filed Mar. 28, 1898.)
(No Model.)
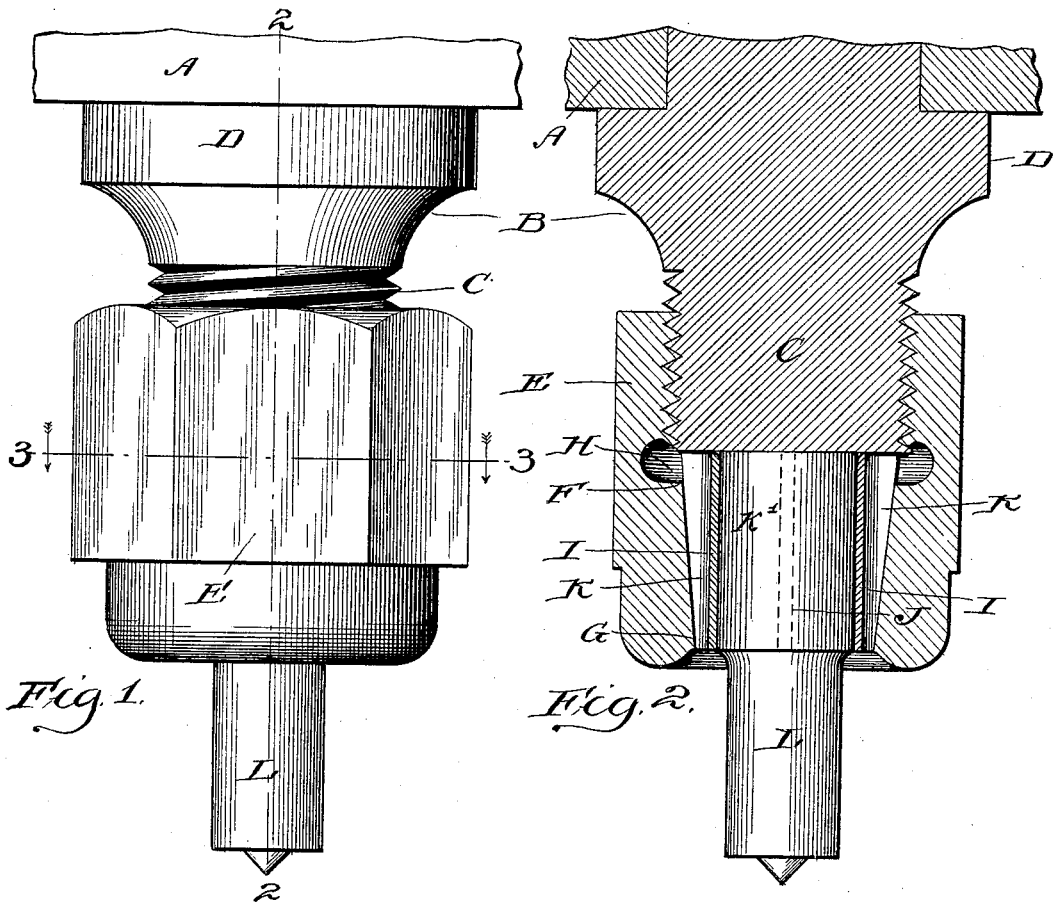
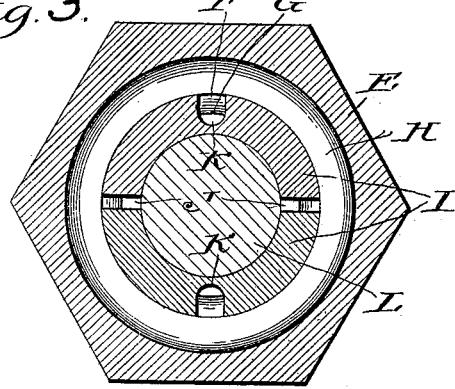
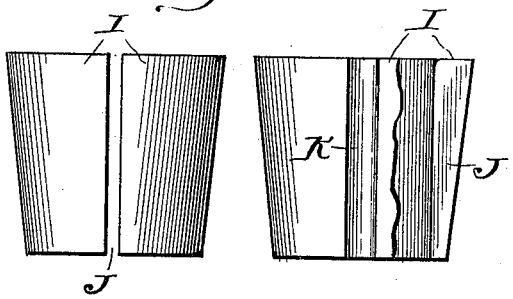
Witnesses
W. C. Coolies
Martin H. Olsen
Inventor
Charles Gabriel
By Rudolph Wm. Lotz
Atty.

UNITED STATES PATENT OFFICE.

CHARLES GABRIEL, OF CHICAGO, ILLINOIS.

CHUCK FOR PRESS-PLUNGERS.

SPECIFICATION forming part of Letters Patent No. 619,557, dated February 14, 1899.

Application filed March 28, 1898. Serial No. 675,408. (No model.)

*To all whom it may concern:*

Be it known that I, CHARLES GABRIEL, a citizen of the United States, residing at Chicago, in the county of Cook and State of Illinois, have invented certain new and useful Improvements in Chucks for Press-Plungers; and I do hereby declare the following to be a full, clear, and exact description of the invention, such as will enable others skilled in the art to which it appertains to make and use the same.

My invention relates to a novel construction in a chuck for press or punch plungers and a punch therefor, the object being to provide a device of this character by means of which the male member of a punch or die can be more simply constructed than heretofore and firmly secured to the plunger and be made easily removable; and it consists in the features of construction and combinations of parts hereinafter fully described and claimed.

In the accompanying drawings, illustrating my invention, Figure 1 is a side elevation of a chuck constructed in accordance with my invention, showing it secured to the plunger and holding a male member of a punch. Fig. 2 is a central longitudinal section on the line 2 2 of Fig. 1. Fig. 3 is a transverse section on the line 3 3 of Fig. 1. Fig. 4 shows two detail views in elevation, one being partially in section, of the one member of the chuck.

Referring now to said drawings, A indicates a portion of a punch-plunger, in the lower end of which the chuck B is rigidly mounted in any suitable manner. Said chuck B comprises the spindle C, provided with a circumferential flange D, adapted to engage the lower face of the plunger A, and is screw-threaded at its lower end to receive the nut E, which is interiorly screw-threaded at its upper end. Below said screw-threaded portion said nut E is interiorly contracted, as at F, and tapered from said portion F to its lower end G, which is smaller than said portion F. An interior circumferential groove H is formed in said nut E below said screw-threaded portion and above said tapered portion for obvious reasons. Within said tapered portion of said nut E a split ring I is mounted, which consists of two practically semicircular sections having spaces J between their adjacent ends and provided midway between their ends with longitudinal grooves K in their outer faces. The inner faces of said sections of said ring I are cylindrical, while their outer faces are tapered to coincide with the taper of the nut E. The grooves K are parallel at their inner ends with said inner faces of said sections of said ring I, thus varying in depth in accordance with the taper of the outer faces. Said sections of said ring I are slightly rounded off along their upper edges to prevent them from burring or spreading.

The male member L of the punch is inserted in the said ring and abuts against the lower end of spindle C. The nut E is then screwed up upon said spindle C, thus first forcing the upper end of the ring I against the lower end of said spindle and then contracting it around the shank of said member L of the punch and firmly clamping same and simultaneously centering it. Said sections of said ring I are adapted to give along the grooves K, where they are obviously weakest.

Heretofore when it was desired to replace a punch it has always been necessary to remove the entire nut, insert a new punch, and replace the nut on the spindle, thus consuming a great deal of time and necessitating the use of a form of punch which is expensive, owing to the amount of turning in a lathe.

My construction enables the use of a punch, as shown, which consists of a piece of shafting the size of the shank K′, which is turned off to the desired size of the hole to be punched—a simple and cheap operation. One man can turn out about one hundred of said punches per diem against ten or twelve of the kind heretofore used.

I claim as my invention—

A chuck for press-plungers comprising a spindle adapted to be secured to the plunger and screw-threaded at its lower end, a nut having an opening screw-threaded at its upper end adapted to fit said screw-threaded portion of said spindle and tapered below said screw-threaded portion, a split ring in said nut comprising two practically semicircular sections tapered on their outer faces to correspond with the taper of said opening in said nut and having cylindrical inner faces, and longitudinal grooves in said sections midway between their ends and parallel with their inner faces, substantially as described.

In testimony whereof I affix my signature in presence of two witnesses.

CHARLES GABRIEL.

Witnesses:
RUDOLPH WM. LOTZ,
WM. B. SNOWHOOK.